United States Patent
Toda et al.

(10) Patent No.: US 6,799,103 B2
(45) Date of Patent: Sep. 28, 2004

(54) OPERATING CHARACTERISTICS CONTROL DEVICE FOR A VEHICLE

(75) Inventors: Hiroshi Toda, Kariya (JP); Yoshiyuki Yasui, Nagoya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/349,973

(22) Filed: Jan. 24, 2003

(65) Prior Publication Data

US 2003/0139863 A1 Jul. 24, 2003

(30) Foreign Application Priority Data

Jan. 24, 2002 (JP) ........................................ 2002-016205

(51) Int. Cl.[7] ................................................ B62D 5/04
(52) U.S. Cl. ........................ 701/36; 180/271; 180/443; 382/181; 280/5.518
(58) Field of Search .......................... 280/728.1, 5.518, 280/735, 806; 180/271, 443, 446, 273, 169, 197; 382/181; 340/905; 701/41, 65, 72, 84, 197

(56) References Cited

U.S. PATENT DOCUMENTS

| 5,748,473 | A | * | 5/1998 | Breed et al. ................ 280/735 |
| 6,256,561 | B1 | * | 7/2001 | Asanuma ..................... 701/41 |
| 6,275,772 | B1 | * | 8/2001 | Sugimoto et al. ........... 701/301 |
| 2001/0016793 | A1 | * | 8/2001 | Ikemoto ....................... 701/41 |
| 2001/0020902 | A1 | * | 9/2001 | Tamura ....................... 340/905 |
| 2002/0043423 | A1 | * | 4/2002 | Endo et al. .................. 180/446 |
| 2002/0059023 | A1 | * | 5/2002 | Takagi et al. ................. 701/70 |
| 2002/0125063 | A1 | * | 9/2002 | Kurishige et al. .......... 180/443 |
| 2002/0177934 | A1 | * | 11/2002 | Yokota et al. ................ 701/45 |
| 2003/0033065 | A1 | * | 2/2003 | Vos et al. ...................... 701/45 |
| 2003/0085557 | A1 | * | 5/2003 | Winkler et al. ............. 280/735 |

FOREIGN PATENT DOCUMENTS

| JP | 2-24268 A | | 1/1990 | |
| JP | 09058503 A | * | 3/1997 | ............ B62D/6/00 |

* cited by examiner

Primary Examiner—Thomas G. Black
Assistant Examiner—Tuan C To
(74) Attorney, Agent, or Firm—Burns, Doane, Swecker & Mathis, L.L.P.

(57) ABSTRACT

An operating characteristics control device for a vehicle includes a physical constitution detecting device for detecting a physical constitution of a passenger, an operation device operated by the passenger, a condition changing device operated by the operation device and changing the condition of the vehicle and an operating characteristic setting device for setting a characteristic showing a relationship between an operating force applied to the operation device and the condition of the vehicle changed by the operation of the condition changing device in response to the physical constitution of the passenger detected by the physical constitution detecting device.

10 Claims, 8 Drawing Sheets

OPERATING CHARACTERISTICS CONTROL DEVICE FOR A VEHICLE

CROSS REFERENCE TO RELATED APPLICATIONS

This application is based on and claims priority under 35 U.S.C. § 119 with respect to a Japanese Patent Application 2002-016205, filed on Jan. 24, 2002, the entire content of which is incorporated herein by reference.

FIELD OF THE INVENTION

This invention relates to an operating characteristics control device for a vehicle. More particularly, this invention pertains to an operating characteristics control device for a vehicle in which various conditions of the vehicle controlled based on a manual operation of a passenger is controlled according to the individual ability of the passenger.

BACKGROUND OF THE INVENTION

A conventional device which controls an operating characteristic is disclosed in, for example, Japanese patent Laid-open publication No. 2-24269. This device is a power steering device which includes a steering valve changed in response to a steering direction of a steering wheel and an electromagnetic flow amount control valve for controlling the amount of oil supplied to a power cylinder. The amount of current which is supplied to the electromagnetic flow amount control valve is controlled in response to a physical strength of a driver. In this device, since a steering assist force can be choose in response to the physical strength of the driver, it is able to control the steering assist force which fits the physical strength of the driver and the steering operation is stable.

In this above prior device, however, the physical strength of the driver is measured by means of a physical strength measuring apparatus including a muscular strength sensor which is stuck on an arm of the driver for measuring the strain of the muscle of the driver. Therefore, whenever the driver changes, it is necessary to measure the physical strength of the driver by means of the physical strength measuring apparatus and very troublesome preparation is required for controlling the steering assist force as an operating characteristic.

SUMMARY OF THE INVENTION

It is, therefore, an object of the present invention to overcome the above drawback.

In order to achieve the objective, there is provided an operating characteristics control device for a vehicle which includes a physical constitution detecting means for detecting a physical constitution of a passenger, an operation means operated by the passenger, a condition changing means operated by the operation means and changing the condition of the vehicle and an operating characteristic setting means for setting a characteristic showing a relationship between an operating force applied to the operation means and the condition of the vehicle changed by the operation of the condition changing means in response to the physical constitution of the passenger detected by the physical constitution detecting means.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Having generally described the present invention, a further understanding of the invention can be obtained now according to embodiments of the present invention with reference to FIGS. 1 to 9 in accompanying drawings.

Figure 1:
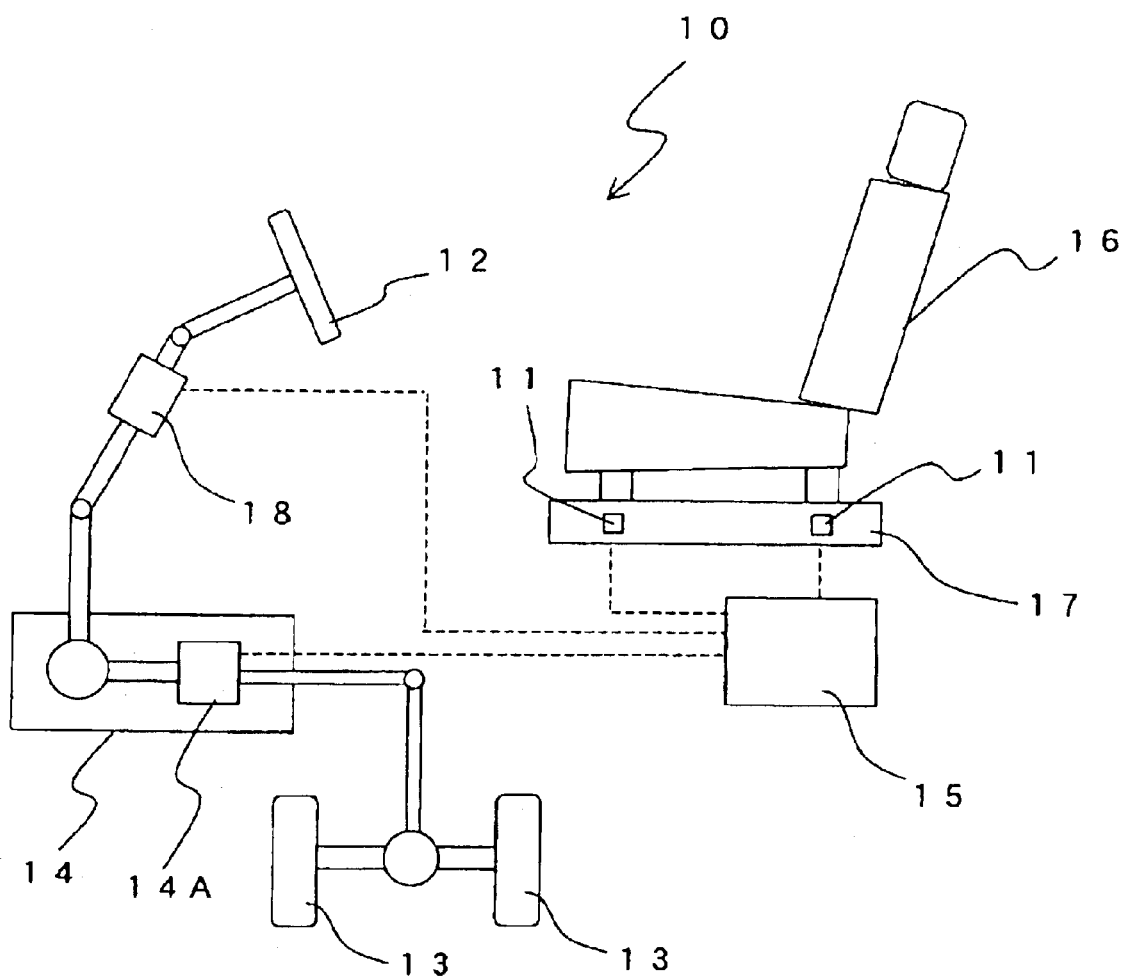
FIG. 1 is a schematic illustration showing an operating characteristics control device for a vehicle in accordance with a first embodiment of the present invention.
Figure 2:
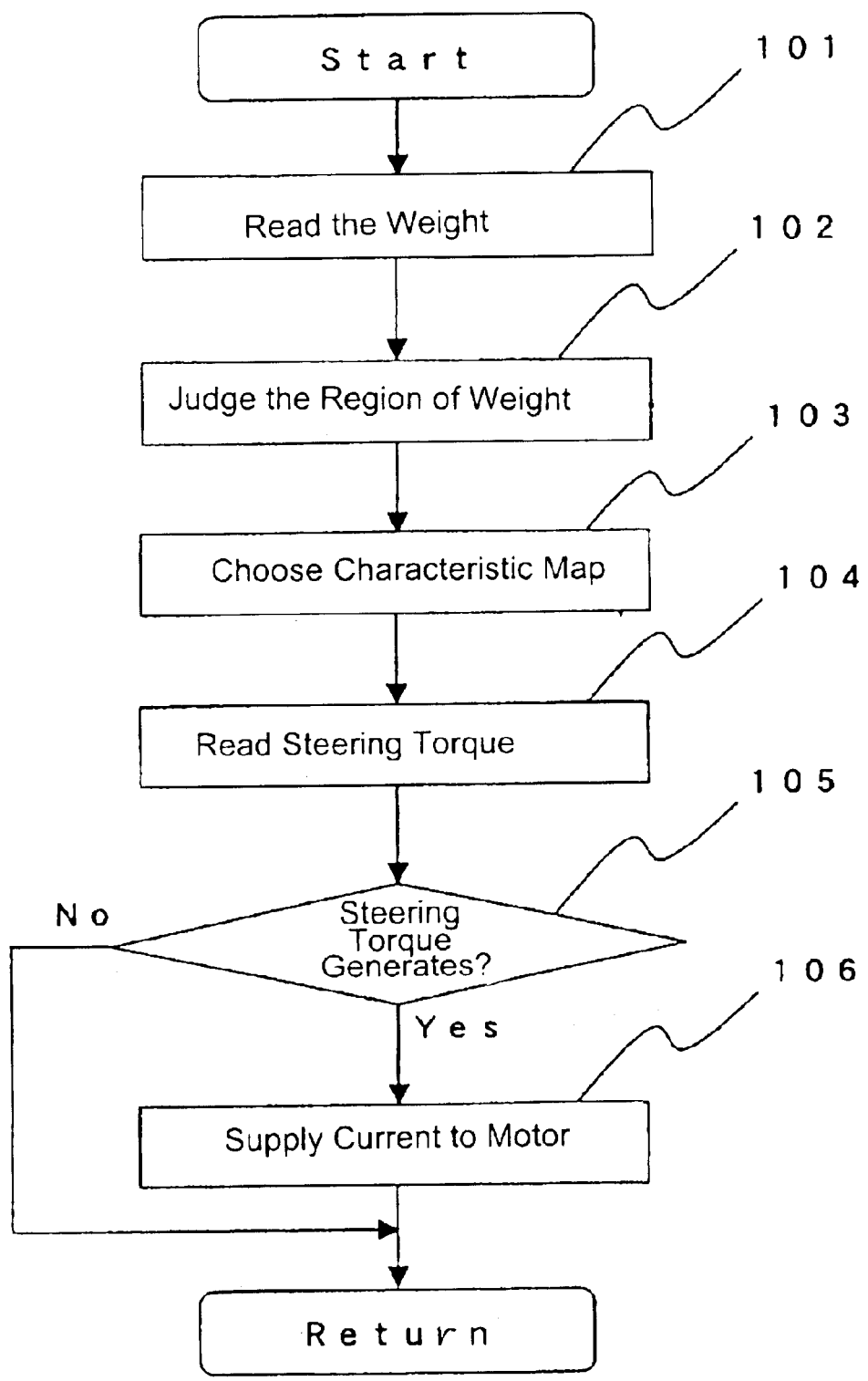
FIG. 2 is a flow chart showing a routine for controlling an operating characteristic in accordance with a first embodiment of the present.
Figure 3:
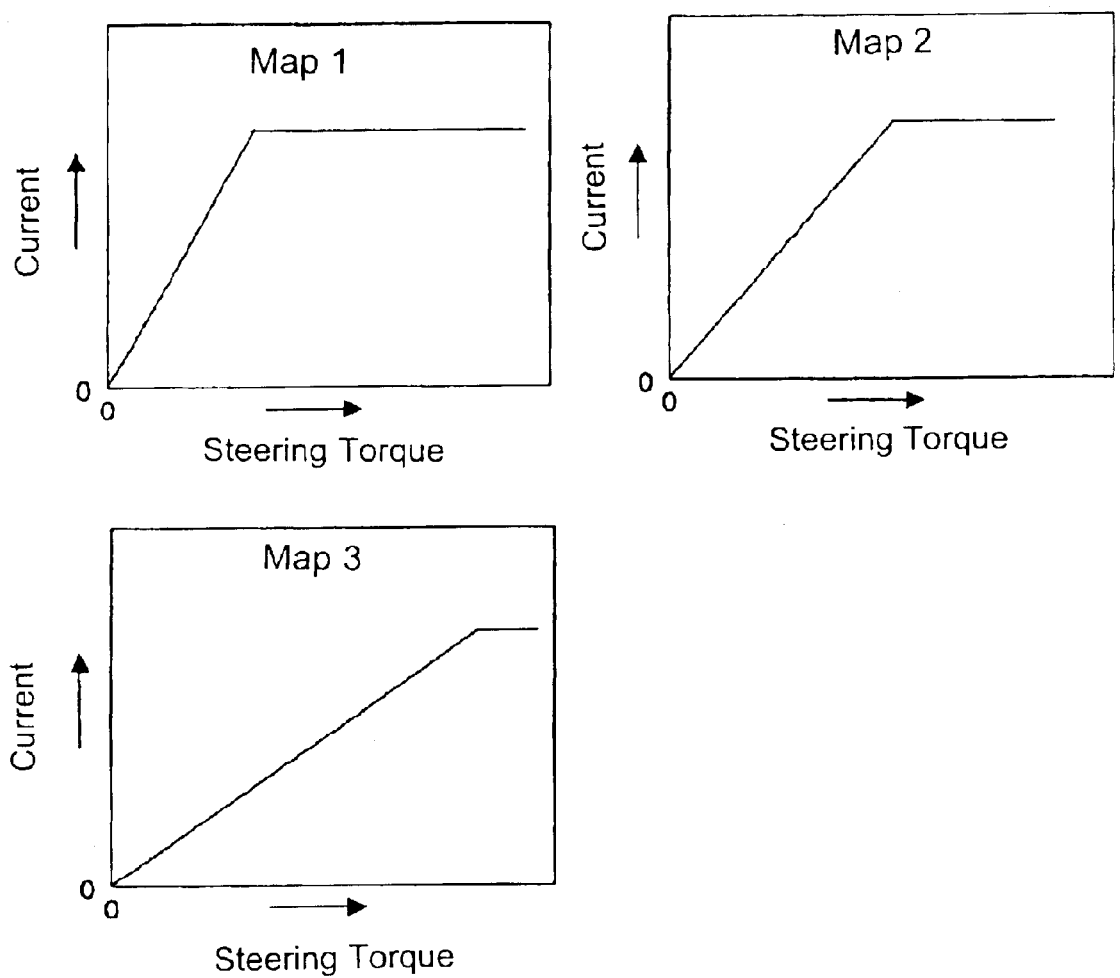
FIG. 3 is a graph showing characteristic maps in accordance with a first embodiment of the present invention.

FIGS. 1 to 3 show a first embodiment of the present invention. Referring to FIG. 1, an operating characteristics control device for a vehicle 10 comprises a physical constitution detecting device which detects a physical constitution of a passenger and which includes load sensors 11, a steering wheel 12 which corresponds to an operating means operated by the passenger, front wheels 13 which is operated on the basis of the operation of the steering wheel 12 and which correspond to a condition changing means, a power steering device 14 which generates a steering force for steering the front wheels 13 in response to the operation of the steering wheel 12 and a control circuit 15 which controls the power steering device 14 so as to set or change a characteristic showing a relationship between an operating force applied to the steering wheel 12 by the passenger and the condition of the front wheels 13 operated by the power steering device 14 in response to the physical constitution of the passenger detected by the physical constitution detecting device.

The power steering device 14 includes an electric motor 14A which can steer the front wheels 13 mechanically connected to the steering wheel 12. The power steering device 14 is so called torque assist typed power steering device and generates a steering force which is the sum of the steering torque applied to the steering wheel 12 by the driver and the driving torque of the electric motor 14. The steering torque applied to the steering wheel 12 by the driver is converted to an electric signal by a torque sensor 18 and the electric motor 14A is driven on the basis of this electric signal so as to operate the front wheels 13. A steering assist force which assists the steering of the front wheels 13 is changed by a value of current supplied to the electric motor 14A.

The physical constitution detecting device is constituted by the load sensors 11 which are mounted on a pair of seat rails 17 (FIG. 1 shows only one seat rail) slidably supporting a seat 16. Each of the load sensors 11 is constituted by a strain gauge. The load sensor 11 is mounted on a front portion and a rear portion of each seat rail 17 and therefore four load sensors are 11 mounted on the seat rails 17. Thereby, the load which is applied to the seat 16 is detected by four load sensors 11 and the weight of the passenger is detected by the detected value of the load sensors 11. The weight of the passenger corresponds to the physical constitution of the present invention.

The control circuit 15 which corresponds to an operating characteristic setting means of the present invention is electrically connected to various sensors (not shown) and controls an engine, a brake system, a transmission and so on in response to the detected signals of the various sensors.

The operation of the operating characteristics control device 10 having the above structure will now be described on the basis of a flow chart shown in FIG. 2. Referring to FIG. 2, the weight of the driver detected by the load sensor 11 is read in step 101. Next, in step 102, it is judged to which predetermined regions the weight read in the control circuit 15 belongs. In this embodiment, the predetermined regions A, B and C are previously memorized In the control circuit 15. Then, in step 103, the rate of the force which the power steering device 14 steers the front wheels 13 with respect, to the steering torque applied to the steering wheel 12 is set by the region of the weight of the driver. Namely, a characteristic map showing the relationship between the steering torque and the value of current supplied to the electric motor 14A is set in response to the region to which the weight of the driver belongs. The setting of the characteristic map is performed according to the following table 1 which is previously memorized in the control circuit 15.

TABLE 1

| Weight | Region A | Region B | Region C |
|---|---|---|---|
| Characteristic map | Characteristic map 1 | Characteristic map 2 | Characteristic map 3 | where the region B is larger than the region A and is smaller than the region C.

FIG. 3 shows the characteristic maps 1 to 3 one of which is set in stop 103. As shown in FIG. 3, one of the characteristic maps 1 to 3 is set so that the value of current supplied to the electric motor 14A with respect to the steering torque decreases in proportion as the increase of the weight of the driver. When the characteristic map is set and the steering torque of the steering wheel 12 detected by the torque sensor 18 is read in step 104. Next, in step 105, it is judged whether the steering torque generates or not. When the steering torque generates, step 106 is performed and the value of current corresponding to the steering torque is supplied to the electric motor 14A according to the characteristic map set in the step 103. When it is judged that the steering torque does not generate in the step 106, the current is not supplied to the electric motor 14A and the operation of the operating characteristics control device is terminated. As mentioned above, since the steering assist force of the front wheels 13 by the power steering device 14 with respect to the steering torque applied to the steering wheel 12 is set In response to the weight of the driver, the steering operation is stable free from the physical constitution of the driver.

In the above mentioned first embodiment, it is unnecessary that the steering wheel is mechanically connected to the front wheels. For example, it is able to obtain the steering force only by the operation of the power steering device.

Further, it is able to connect and disconnect between the steering wheel and the front wheels by an electromagnetic clutch and so on.

Figure 4:
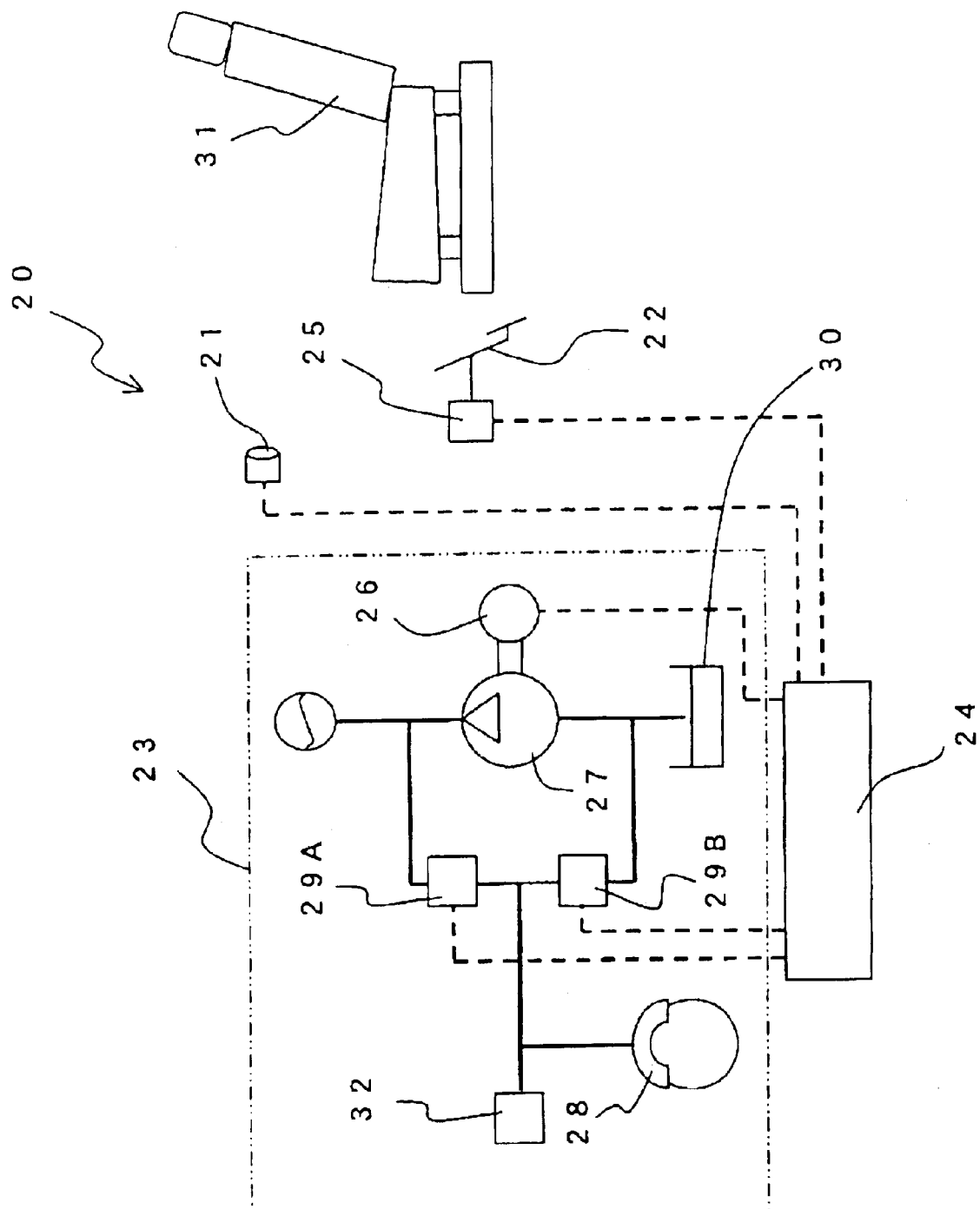
FIG. 4 is a schematic illustration showing an operating characteristics control device for a vehicle in accordance with a second embodiment of the present invention.
Figure 5:
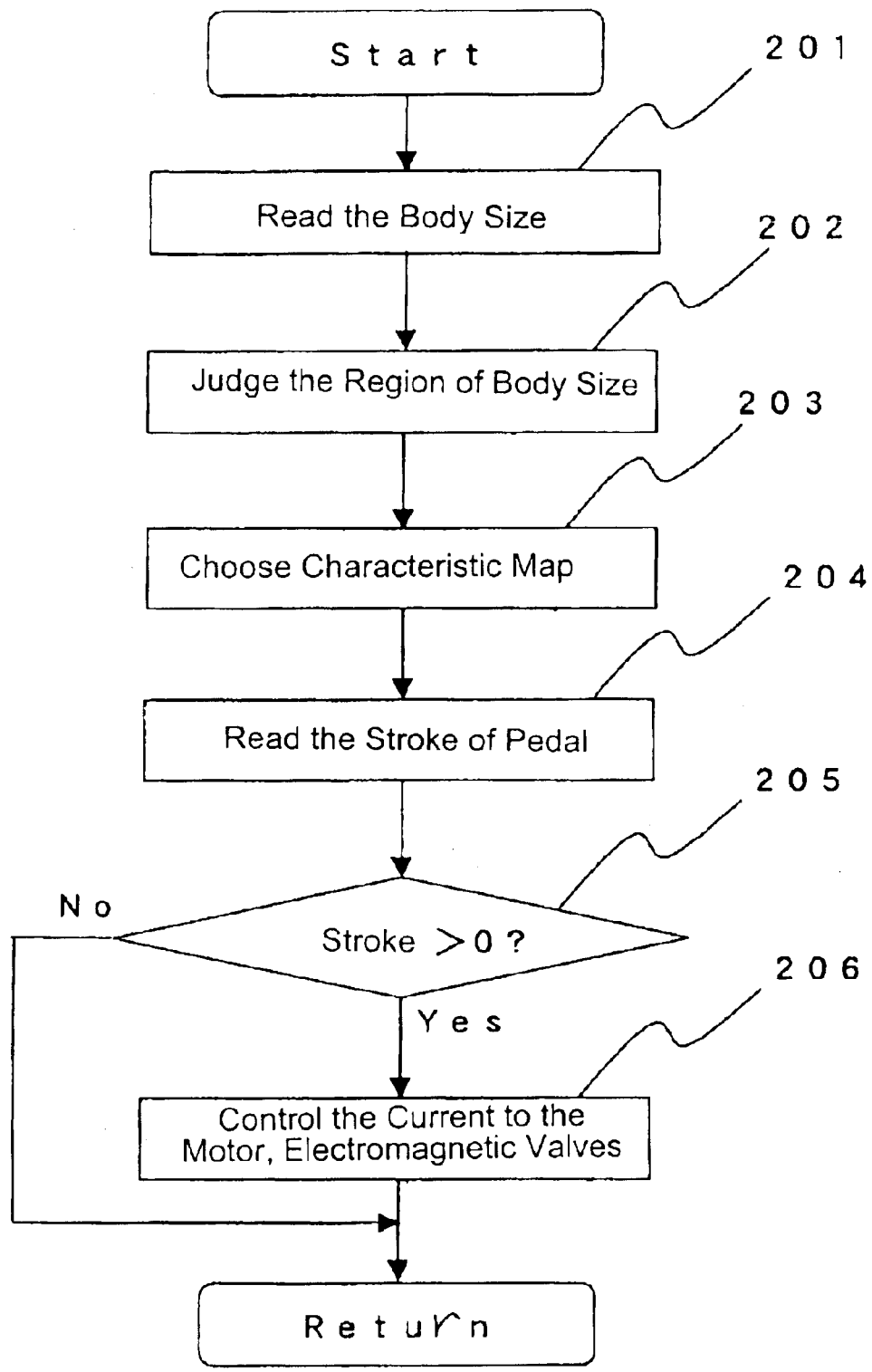
FIG. 5 is a flow chart showing a routine for controlling an operating characteristic in accordance with a second embodiment of the present.
Figure 6:
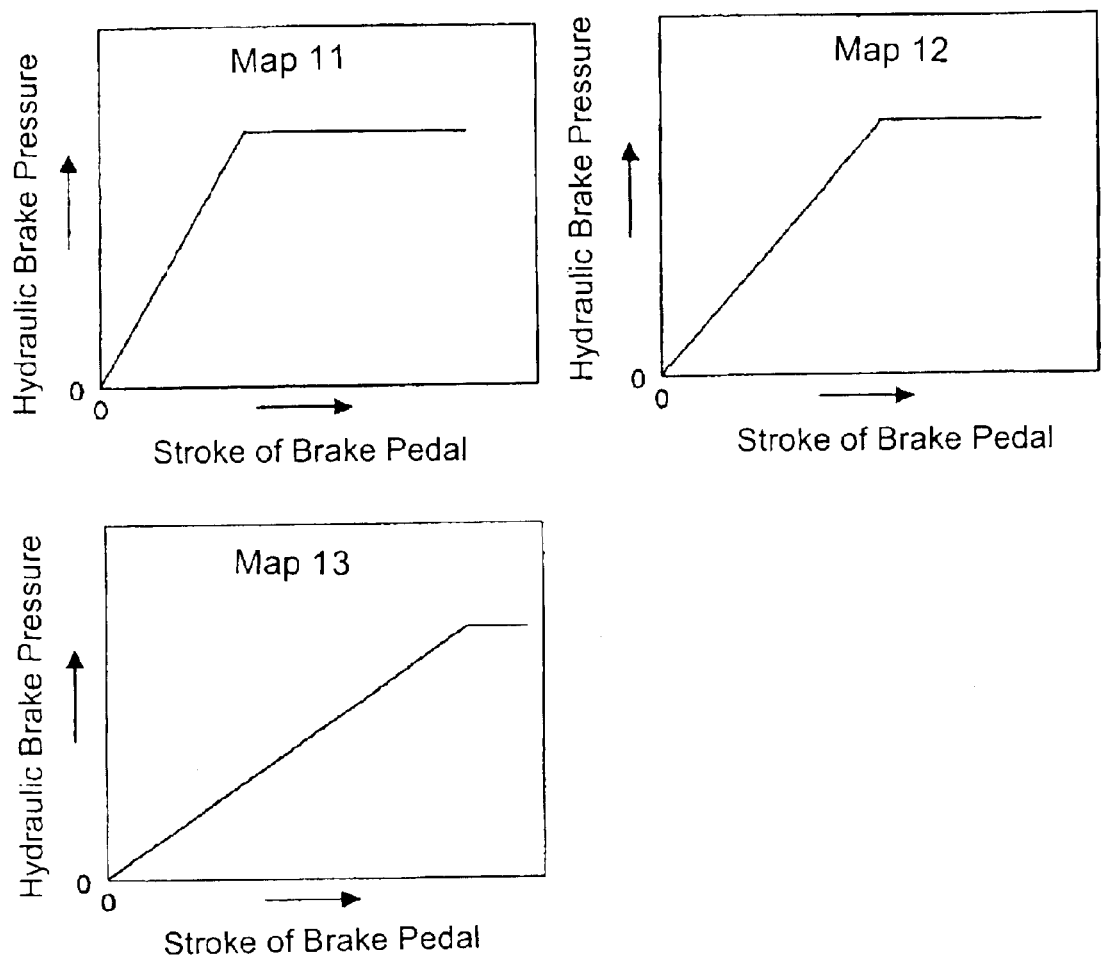
FIG. 6 is a graph showing characteristic maps in accordance with a second embodiment of the present invention.

FIGS. 4 to 6 show a second embodiment of the present invention. Referring to FIG. 4, an operating characteristics control device for a vehicle 20 comprises a physical constitution detecting device 21 which detects a physical constitution of a passenger, a brake pedal 22 which corresponds to an operating means operated by the passenger, a brake device 23 which is operated on the basis of the operation of the brake pedal 22 and which correspond to a condition changing means and a control circuit 24 which corresponds to an operating characteristic setting means of the present invention and which controls the brake device 23 so as to set or change a characteristic showing a relationship between a depressing force of the brake pedal 22 by the passenger and the braking force generated by the brake device 23 in response to the physical constitution of the passenger detected by the physical constitution detecting device 21. In the second embodiment, the relationship between the depressing force of the brake pedal 22 and a stroke of the brake pedal 22 is constant and the stroke of the brake pedal 22 detected by the stroke sensor 25 is used for a parameter for detecting the depressing force of the brake pedal 22.

The brake device 23 is, so called a by wire typed brake device. The stroke of the brake pedal 22 (corresponding to the depressing force of the brake pedal) is converted to an electric signal and the brake device 23 applied the braking force to the vehicle on the basis of the electric signal.

When the brake pedal 22 is depressed, the current corresponding to the stroke of the brake pedal 22 is supplied to an electric motor 26 and the electric motor 26 is driven. When the electric motor 26 is driven, a pump 27 connected to the electric motor 26 is driven. An electromagnetic valve 29A is disposed in a conduit between a discharge port of the pump 27 and wheel cylinders 28 (FIG. 4 shows only one wheel cylinder). An electromagnetic valve 29B is disposed in a conduit between a suction port of the pump 27 and the wheel cylinders 28. When the electromagnetic valve 29A is opened and the electromagnetic valve 29B is closed, the hydraulic brake pressure discharged from the pump 27 is supplied to the wheel cylinders 28. When the hydraulic brake pressure, is supplied to the wheel cylinders 28 the braking force corresponding to the magnitude of the hydraulic brake pressure is applied to the vehicle. In case of that the driver continues to depress the brake pedal 22 with the constant stroke, the hydraulic brake pressure in the wheel cylinders 28 must be held in the constant value so that the constant braking force is applied to the vehicle. In this case, the electromagnetic valves 29A and 29B are closed and the hydraulic brake pressure in the wheel cylinders 28 is held in the constant value. In this case, the electric motor 26 is not driven. Further, the hydraulic brake pressure in the wheel cylinders 28 is detected by a pressure sensor 32 and the detected signal thereof is fed to the control circuit 24.

In case of that the braking force is released, the electromagnetic valve 29B is opened and the hydraulic brake fluid in the wheel cylinders 28 is returned to a reservoir 30. The hydraulic brake fluid returned to the reservoir 30 is sucked by the pump 27 through the suction port and is discharged under pressure from the discharge port again. The braking force of the vehicle corresponds to the hydraulic brake pressure supplied to the wheel cylinders 28. The hydraulic brake pressure supplied to the wheel cylinders 28 is substantially in proportion with the driving force of the pump 27 when the electromagnetic valve 29A opens. The pump 27 is driven by the electric motor 26 and the driving force of the electric motor 26 is in proportion with the value of current supplied to the electric motor 26. Namely, the braking force of the vehicle corresponds to the value of current supplied to the electric motor 26. Accordingly, in the second embodiment, the value of current corresponding to the stroke is supplied to the electric motor 26 by means of a characteristic map showing a relationship between the stroke of the brake pedal 22 and the value of current supplied to the electric motor 26 and thereby the braking force corresponding to the stroke of the brake pedal 22 is applied to the vehicle.

The physical constitution detecting device 21 is constituted by an image recognition sensor which recognizes the physical constitution by an image. The physical constitution detecting device 21 picks up the image of the driver sit on a seat 31 and detects the body size (the physical constitution). Further, physical constitution detecting device 21 can also recognize the sexuality of the driver, the position of driver's eye and so on and therefore the condition of the vehicle can be controlled with a high degree of accuracy according to the driver.

The operation of the operating characteristics control device 20 having the above structure will now be described on the basis of a flow chart shown in FIG. 5. Referring to FIG. 5, the body size of the driver detected by the image recognition sensor is read in step 201. Next, in step 202, it is judged to which predetermined regions the body size read in the control circuit 24 belongs. In this embodiment, the predetermined regions a, b and c are previously memorized in the control circuit 24. Then, in step 203, the rate of the braking force which the brake device 23 applies to the vehicle with respect to the depressing force of the brake pedal 22 is set by the region of the body size of the driver. Since the relationship between the depressing force and the stroke is constant, a characteristic map showing the relationship between the stroke and the hydraulic brake pressure in the wheel cylinders 28 is set in response to the body size of the driver. The setting of the characteristic map is performed according to the following table 2 which is previously memorized in the control circuit 24 and one of characteristic maps 11 to 13 is chosen.

TABLE 2

| Body size | Region a | Region b | Region c |
|---|---|---|---|
| Characteristic map | Characteristic map 11 | Characteristic map 12 | Characteristic map 13 | where the region b is larger than the region a and is smaller than the region c.

FIG. 6 shows the characteristic maps 11 to 13 one of which is set in step 203. As shown in FIG. 6, one of the characteristic maps 1 to 3 is set so that the hydraulic brake pressure in the wheel cylinders 28 with respect to the stroke decreases in proportion as the Increase of the body size of the driver. Then, the stroke of the brake pedal 22 is red in step 204 and it is jugged whether the stroke is larther than 0, namely it is judged whether the brake pedal 22 is depressed or not in step 205. When it was judged in the step 205 that the stroke is larger than 0, the step 206 is performed and the supplying the current to at least one of the electric motor 26, the electromagnetic valves 29A and 29B is controlled so that the hydraulic brake pressure in the wheel cylinder 28 detected by the pressure sensor 32 becomes the hydraulic brake pressure shown in the characteristic map set in the step 203. When it was judged that the stroke is not larger than 0, the current is not supplied to the electric motor 26 and so on because the brake pedal 22 is not depressed. As mentioned above, since the magnitude of the braking force which generates the brake device 23 with respect to the stroke of the brake pedal 22 is set in response to the body size of the driver, the braking force is stable free from the body size of the driver.

In the above mentioned second embodiment, it is able to change a characteristic showing a relationship between the depressing force and the stroke of the brake pedal in response to the body size of the driver without changing the hydraulic brake pressure in the wheel cylinders with respect to the stroke. As a result, a characteristic showing the relationship between the depressing force of the brake pedal and the braking force of the vehicle can be changed. In this modified embodiment, a single characteristic map showing a relationship between the stroke and the hydraulic brake pressure satisfies the operation thereof. However, a plurality of characteristic maps showing relationships between the depressing force and the stroke of the brake pedal according to the body sizes of the driver must be previously memorized.

In another modified embodiment, an accelerator pedal may be used as an operating means and a driving force generating device may be used as a condition changing means. In this modified embodiment, a characteristic showing a relationship between the depressing force of the accelerator pedal by the driver and the driving force generated by the driving force generating device is set in response to the body size of the driver. Further, in the other modified embodiment, a clutch pedal may be used as an operating means and a clutch device which connects and disconnects between a transmission and an engine may be used as a condition changing means. In this modified embodiment, a characteristic showing a relationship between the depressing force of the accelerator pedal by the driver and the position at which the clutch device disconnects between the transmission and the engine is set in response to the body size of the driver. In these modified embodiments, it is desirable that a by wire typed driving force generating device and a by wire typed clutch device.

Figure 7:
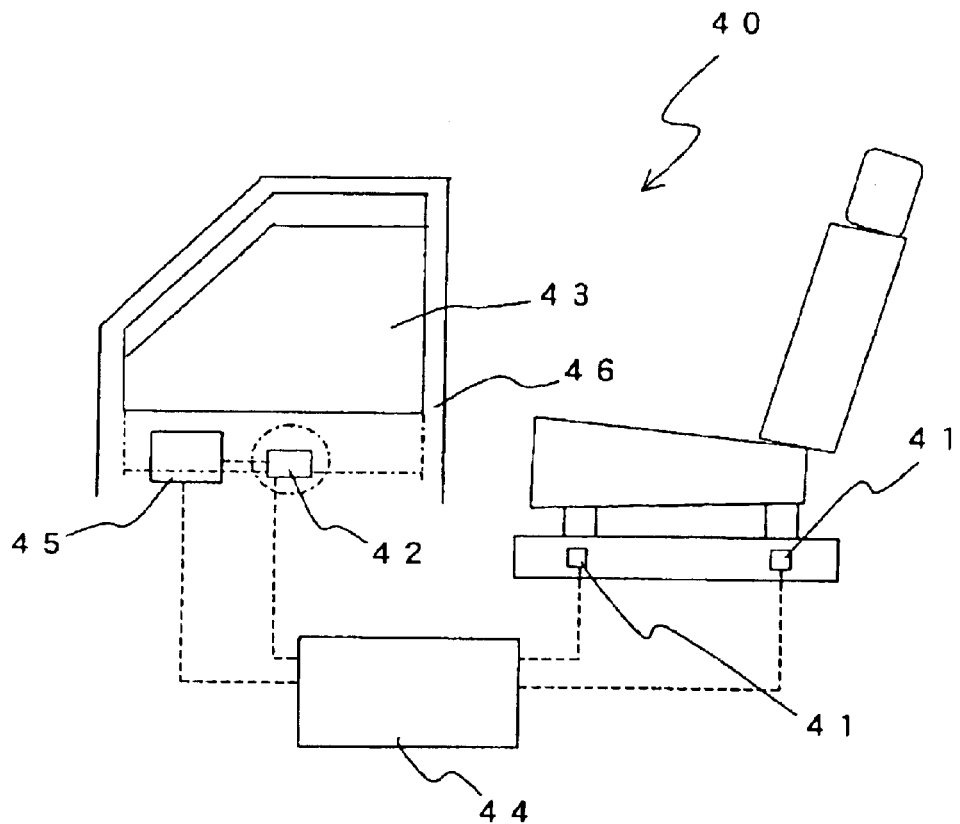
FIG. 7 is a schematic illustration showing an operating characteristics control device for a vehicle in accordance with a third embodiment of the present invention.
Figure 8:
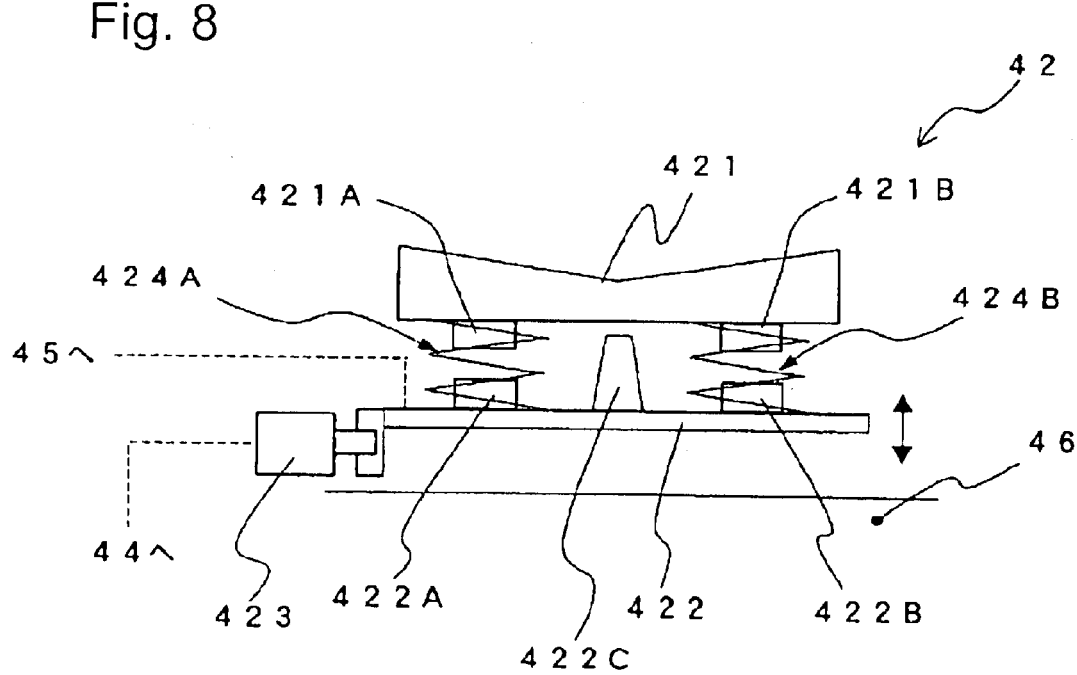
FIG. 8 is a partly enlarged view of FIG. 7.
Figure 9:
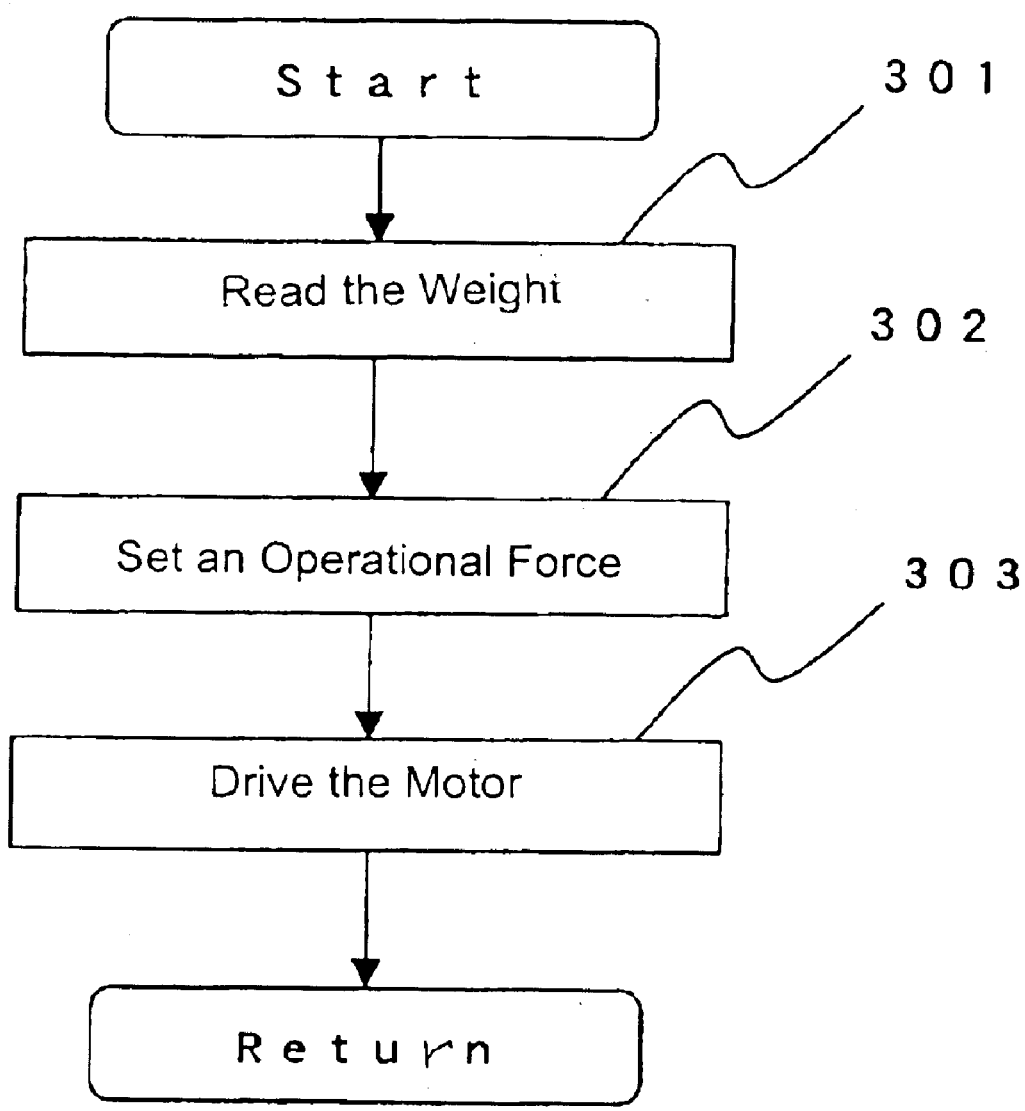
FIG. 9 is a flow chart showing a routine for controlling an operating characteristic in accordance with a third embodiment of the present invention.

FIGS. 7 to 9 show a third embodiment of the present invention. Referring to FIG. 7, an operating characteristics control device for a vehicle 40 comprises a physical constitution detecting device 41 which detects a physical constitution of a passenger, a change-over switch 42 which corresponds to an operating means operated by the passenger, a operating member 43 which is operated on the basis of the operation of the change-over switch 42 and which corresponds to a condition changing means and a control circuit 44 which corresponds to an operating characteristic setting means of the present invention and which sets or changes a operational force being required for changing the change-over switch 42 in response to the physical constitution of the passenger.

In the third embodiment, the change-over switch 42 is a power window switch for opening and closing a window of the vehicle and the operating member 43 is the window. When the change-over switch 42 is operated, a window regulator 45 is driven and the window 43 is opened and closed. FIG. 8 is an enlarged view which show neighborhood of the change-over switch 42. The change-over switch 42 includes a main body 421 pushed by the passenger when the window 43 is opened and closed and a base plate 422. An open side portion 421A and a close side portion 421B are formed on a lower portion of the main body 421. Further, an open side terminal 422A and a close side terminal 422B are formed on an upper surface of the base plate 422.

When the open side portion 421A contacts with the open side terminal 422A by the operation of the main body 421 by the passenger, an electric motor 423 rotates in one direction and the window 43 opens. Further, when the close side portion 421B contacts with the close side terminal 422B by the operation of the main body 421 by the passenger, an electric motor 423 rotates in the other direction and the window 43 closes. When the passenger does not operate the change-over switch 42, the open side portion 421A does not contact with the open side terminal 422A by a coil spring 424A disposed between the open side portion 421A and the open side terminal 422A and the close side portion 421B does not contact with the close side terminal 422B by a coil spring disposed between the close side portion 421B and the close side terminal 422B. A projecting portion 422C which projects toward the upper side is formed on the upper surface of the base plate 422. Thereby, it is prevented that the open side portion 421A and the close side portion 421B contact simultaneously with the open side terminal 422A and the close side terminal 422Be, respectively. The base plate 422 is constituted so as to separate from a door main body 46 and can move so as to change a distance in the top and bottom direction with respect to the main body 421. The movement of the base plate 421 in the top and bottom direction is performed by the driving of the electric motor 423 and the driving of the electric motor 423 is controlled by the control circuit 44. The physical constitution detecting device 41 is the same as the physical constitution detecting device 11 and therefore the description thereof is omitted.

The operation of the operating characteristics control device 40 having the above structure will now be described on the basis of a flow chart shown In FIG. 9. Referring to FIG. 9, the weight of the driver detected by the physical constitution detecting device 41 is read In step 301. Next, In step 302, the operational force required for operating the change-over switch 42 is set in response to the physical constitution of the driver. Namely, the operational force required for contacting the open side portion 421A or the close side portion 422A with the open side terminal 421B or the close side terminal 421B respectively is set in response to the weight of the driver. Then, in step 303, the electric motor 423 is driven and the base plate 422 is moved so that the change-over switch 42 is operated in fact by the operational force set in the step 302. When the base plate 422 moves so that the open side portion 421A or the close side portion 422A approaches the open side terminal 421B or the close side terminal 421B, since the amount of the flexure of the coil springs 424A or 424B until the open side portion 421A or the close side portion 422A contacts with the open side terminal 421B or the close side terminal 421B becomes smaller, the operational force required for operating the change-over switch 42 decreases. On the contrary, when the base plate 422 moves so that the open side portion 421A or the close side portion 422A separates from the open side terminal 421B or the close side terminal 421B, since the amount of the flexure of the coil springs 424A or 424B until the open side portion 421A or the close side portion 422A contacts with the open side terminal 421B or the close side terminal 421B increases, the operational force required for operating the change-over switch 42 increases.

As mentioned above, since the operational force required for operating the change-over switch 42 is set in response to the weight of the passenger, it is able to operate the change-over switch and to open and close the window 43 according to the passenger. The passenger is not limited to the driver and corresponds to the passenger which sit on the assistant driver's seat and the rear seat too.

In a modified embodiment of the above third embodiment, a turn signal switch, a wiper switch, sunroof switch or a power seat switch may be used as an change-over switch and a turn signal, a wiper, a sunroof or a power seat may be used as a condition changing means, in this modified embodiment, It is able to obtain the same effect as the third embodiment.

In the above mentioned first, second and third embodiments, it is able to use, as a physical constitution detecting means, a weight sensor constituted by a capacitance condenser which is disposed at a portion contacting the human body and which detects the weight of the passenger by the change of the capacitance. Alternatively, it is able to use, as a physical constitution detecting means, a sitting position sensor which is disposed in the seat and which is constituted by a plural conducting wires disposed In films. The sitting position sensor detects the physical constitution (the body size) of the passenger. Further, alternatively, it is able to use, as a physical constitution detecting means, a supersonic sensor which detects the physical constitution by the supersonic.

According to the above mentioned first, second and third embodiments, since the operating characteristic is set In response to the physical constitution of the passenger, it is able to control the condition of the vehicle stably without the troublesome preparation. Further, in the vehicle which includes the physical constitution detecting means for judging whether an air-bag system is activated or not, it is not necessary to use an additional hard wear for putting the present invention into operation.

We claim:

1. An operating characteristics control device for a vehicle comprising:
   a physical constitution detecting means for detecting a physical constitution of a passenger;
   an operation means operated by the passenger;
   a condition changing means operated by the operation means and changing the condition of the vehicle; and
   an operating characteristic setting means for setting a characteristic showing a relationship between an operating force applied to the operation means and the condition of the vehicle changed by the operation of the condition changing means in response to the physical constitution of the passenger detected by the physical constitution detecting means.

2. An operating characteristics control device for a vehicle according to claim 1, wherein the operating characteristic setting means sets the magnitude of the operational force required for operating the operation means with a predetermined amount in response to the physical constitution of the passenger for selling the characteristic.

3. An operating characteristics control device for a vehicle according to claim 1, wherein the operating characteristic setting means sets the characteristic so that the rate of the change of the condition of the vehicle with respect to the operational force applied to the operation means gets smaller in proportion as the increase of the physical constitution of the passenger detected by the physical constitution detecting means.

4. An operating characteristics control device for a vehicle according to claim 1, wherein the physical constitution detecting means is constituted by one of a weight sensor which detects a weight of the passenger, a sitting position sensor which detects a sitting position of the driver, a supersonic sensor which detects the physical constitution of the passenger by supersonic or an image recognition sensor which recognizes the physical constitution by an image.

5. An operating characteristics control device for a vehicle according to claim 1, wherein the operation means is constituted by a steering wheel, the condition changing means is constituted by wheels of the vehicle which is steered on the basis of the steering angle of the steering wheel and the operating characteristic setting means sets the steering force required for steering the wheels of the vehicle with a predetermined angle in response to the physical constitution of the passenger.

6. An operating characteristics control device for a vehicle according to claim 5 further comprising a power steering device which generates a steering force for steering the wheels in accordance with the operation of the steering wheel, and wherein the operating characteristic setting means sets the steering force generated by the power steering device in response to the physical constitution of the passenger.

7. An operating characteristics control device for a vehicle according to claim 1, wherein the operation means is constituted by a brake pedal, the condition changing means is constituted by a brake device and the operating characteristic setting means sets a braking force generated by the brake device with respect to a depressing force of the brake pedal by a driver in response to the physical constitution of the driver.

8. An operating characteristics control device for a vehicle according to claim 1, wherein the operation means is constituted by an accelerator pedal, the condition changing means is constituted by a driving force generating device and the operating characteristic setting means sets a driving force generated by the driving force generating device with respect to a depressing force of the accelerator pedal by a driver in response to the physical constitution of the driver.

9. An operating characteristics control device for a vehicle according to claim 1, wherein the operation means is constituted by a change-over switch, the condition changing means is constituted by a operation member operated by the operation of the change-over switch the operating characteristic setting means sets an operational force required for operating the change-over switch in response to the physical constitution of the driver.

10. An operating characteristics control device for a vehicle according to claim 1, wherein the physical constitution detected by the physical constitution detecting means comprises at least a physical attribute of the passenger other than the passenger's weight.

* * * * *